UNITED STATES PATENT OFFICE.

JAMES H. CRAIG, OF PHILADELPHIA, PENNSYLVANIA.

IMPROVEMENT IN COMPOSITION GLUES.

Specification forming part of Letters Patent No. 177,474, dated May 16, 1876; reissue No. 7,714, dated May 29, 1877; application filed March 19, 1877.

*To all whom it may concern:*

Be it known that I, JAMES H. CRAIG, formerly of Indianapolis, Indiana, but now of Philadelphia, Pennsylvania, have invented and produced certain new and useful Improvements in Compounds for Glues; and I hereby declare the following to be a full, clear, and exact description thereof, such as will enable others to make and use the same.

My invention relates to compounds for improving glues; and consists of ingredients compounded in the proportion and in the manner substantially as follows: First, I take three pounds of common glue, and add two ounces of dry white lead, after dissolving it in a half-pint of warm water, which, when added to the glue, imparts a greatly-improved consistency and strength to it; second, I dissolve in warm water one ounce of precipitated chalk, which, in combination with the glue, neutralizes the effect of any acid that might arise by partial fermentation or otherwise, and, as well as the white lead, gives additional consistency and strength to the glue.

Either compound is one that will readily set when applied to use, and is applicable to all purposes for which glue is used, and, moreover, it forms a strong cement for broken earthenware, plate-glass, &c. To prevent decomposition, and to destroy the odor that would otherwise arise, I add about thirty drops of carbolic acid.

I do not limit myself to any particular kind of glue, for any glue known to the trade may be materially improved by being compounded with one or more of the ingredients named, or to the combination of all the ingredients. The proportions of white lead, precipitated chalk, or carbolic acid may also be varied somewhat to suit different purpose, and for use with different glues; but I have found that the proportions herein described are most satisfactory for general use.

I claim—

The adhesive composition herein described, consisting of glue, dry white lead or precipitated chalk, or both, and with or without carbolic acid, in substantially the proportions specified, and in the manner set forth.

JAS. H. CRAIG.

Witnesses:
WM. P. HIBBERD,
OLIVER E. WOODS.